(12) United States Patent
Ahn et al.

(10) Patent No.: US 9,749,508 B2
(45) Date of Patent: Aug. 29, 2017

(54) CAMERA MODULE FOR VEHICLE

(71) Applicant: LG Innotek Co., Ltd., Seoul (KR)

(72) Inventors: Jae Wook Ahn, Seoul (KR); Je Kyung Park, Seoul (KR); Sun Min Hwang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/996,854

(22) Filed: Jan. 15, 2016

(65) Prior Publication Data

US 2016/0212308 A1    Jul. 21, 2016

(30) Foreign Application Priority Data

Jan. 15, 2015  (KR) ........................ 10-2015-0007359

(51) Int. Cl.
| | |
|---|---|
| *H04N 5/225* | (2006.01) |
| *G06K 9/00* | (2006.01) |
| *G03B 17/02* | (2006.01) |
| *G03B 17/08* | (2006.01) |
| *H04N 7/18* | (2006.01) |

(52) U.S. Cl.
CPC ........... *H04N 5/2252* (2013.01); *G03B 17/02* (2013.01); *G03B 17/08* (2013.01); *G06K 9/00791* (2013.01); *H04N 5/2254* (2013.01); *H04N 5/2257* (2013.01); *H04N 7/185* (2013.01)

(58) Field of Classification Search
CPC .... H04N 5/225; H04N 5/2251; H04N 5/2252; H04N 5/2253; H04N 5/2254; G03B 17/02; G03B 17/08; G06K 9/00791
See application file for complete search history.

(56) References Cited

U.S. PATENT DOCUMENTS

| | | | | | |
|---|---|---|---|---|---|
| 4,214,830 | A | * | 7/1980 | Schroder ................ | G03B 17/02 396/301 |
| 5,070,348 | A | * | 12/1991 | Hayakawa ............. | G03B 17/08 396/26 |
| 2003/0216119 | A1 | * | 11/2003 | Mashiko ............... | F21S 48/335 454/275 |
| 2005/0227610 | A1 | * | 10/2005 | Zukor ................... | G03B 17/02 454/339 |

(Continued)

FOREIGN PATENT DOCUMENTS

| | | |
|---|---|---|
| DE | 202005020282 U1 | 6/2007 |
| EP | 1363484 A2 | 11/2003 |

(Continued)

OTHER PUBLICATIONS

Extended European Search Report dated Jun. 10, 2016 in European Application No. 15202908.8.

*Primary Examiner* — Abdelaaziz Tissire
(74) *Attorney, Agent, or Firm* — Saliwanchik, Lloyd & Eisenschenk

(57) ABSTRACT

Embodiments provide a camera module including a lens unit, a coupling unit coupled to the lens unit, a housing coupled to the coupling unit, the housing being configured to accommodate a printed circuit board therein and having a vent formed therein, and a membrane formed of an air-permeable material and configured to close the vent formed in the housing so as to prevent external foreign substances from entering the housing.

20 Claims, 8 Drawing Sheets

(56) References Cited

U.S. PATENT DOCUMENTS

2012/0229701 A1\* 9/2012 Pavithran ............. H04N 5/2252
        348/374
2014/0354878 A1\* 12/2014 Winter ................. H04N 5/2252
        348/374
2015/0070494 A1\* 3/2015 Hess, Jr. .............. H04N 17/002
        348/143

FOREIGN PATENT DOCUMENTS

| GB | 2010501 A | 6/1979 |
| WO | WO-2005/100832 A1 | 10/2005 |
| WO | WO-2013/103548 A1 | 7/2013 |

\* cited by examiner

CAMERA MODULE FOR VEHICLE

CROSS REFERENCE TO RELATED APPLICATION

This application claims priority under 35 U.S.C. §119 to Korean Patent Application No. 10-2015-0007359, filed Jan. 15, 2015, which is hereby incorporated by reference in its entirety.

TECHNICAL FIELD

Embodiments relate to a camera module for a vehicle.

BACKGROUND

Content described herein merely provides background information related to embodiments and does not constitute the related art.

Camera modules having various use purposes may be mounted to vehicles. For example, a camera module that is capable of providing rearward vision while a vehicle is being parked, may be mounted to the rear portion of the vehicle.

In addition, camera modules may also be used in black boxes for vehicles, which have recently become very useful to clarify, for example, the details of an accident and the cause of the accident when a traffic accident occurs. In addition, camera modules are increasingly being used as recognition devices to clearly and easily grasp the situation in blind spots, which are difficult for the driver or passenger of the vehicle to see.

In recent years, the manufacture of so-called smart cars, i.e. vehicles equipped with, for example, collision warning systems, which preemptively detect the possibility of front and rear collisions while the vehicle is being driven to prevent such collisions, and collision avoidance systems, which allow controllers mounted in vehicles to directly avoid collisions between the vehicles without depending on the driving of drivers, is increasing, and the development of associated technology is increasing.

The use of camera modules as external situation recognition means in such smart cars is increasing, and correspondingly the production and technical development of camera modules for vehicles are increasing.

A camera module for a vehicle may include a printed circuit board (PCB). The interior of the camera module in which the printed circuit board is accommodated needs to be cooled by outwardly dissipating heat generated by the printed circuit board. In addition, it is necessary to prevent, for example, the malfunction and failure of the camera module due to moisture by discharging moisture present inside the camera module.

BRIEF SUMMARY

Accordingly, embodiments provide a camera module for a vehicle, which has a configuration capable of cooling the interior thereof and removing moisture present therein.

In one embodiment, a camera module includes a lens unit, a coupling unit coupled to the lens unit, a housing coupled to the coupling unit, the housing being configured to accommodate a printed circuit board therein and having a vent formed therein, and a membrane formed of an air-permeable material and configured to close the vent formed in the housing so as to prevent foreign substances from entering the housing.

In another embodiment, a camera module includes a lens unit, a coupling unit coupled to the lens unit, a housing coupled to the coupling unit, the housing being configured to accommodate a printed circuit board therein and having a vent formed therein, a membrane formed of an air-permeable material and configured to close the vent formed in the housing so as to prevent external foreign substances from entering the housing, and a cover member configured to close the membrane closing the vent.

In a further embodiment, a camera module includes a lens unit, a coupling unit coupled to the lens unit, a housing coupled to the coupling unit and having a vent formed therein, a printed circuit board accommodated inside the housing and having an image sensor mounted thereon, a membrane formed of an air-permeable material and configured to close the vent formed in the housing so as to prevent external foreign substances from entering the housing, and a cover member configured to close the membrane closing the vent.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
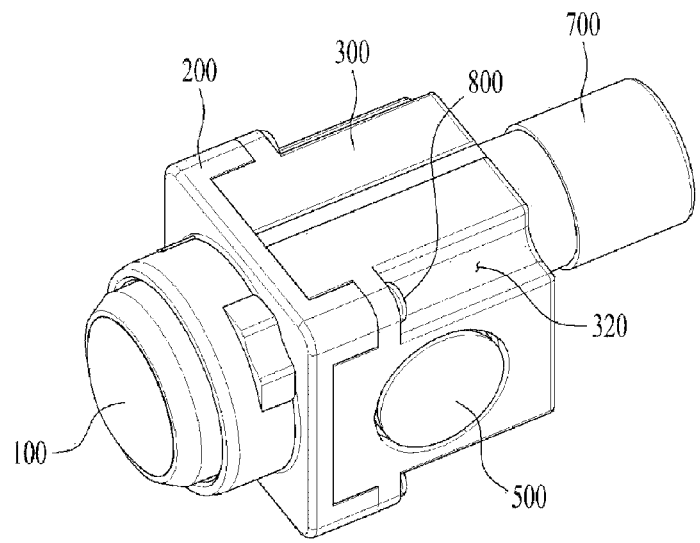
FIG. 1 is a perspective view illustrating a camera module in accordance with one embodiment.

Hereinafter, embodiments will be described with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the disclosure rather unclear. Those skilled in the art will appreciate that some features in the drawings are exaggerated, reduced, or simplified for ease in description, and drawings and elements thereof are not shown always at the proper rate.

Figure 2A:
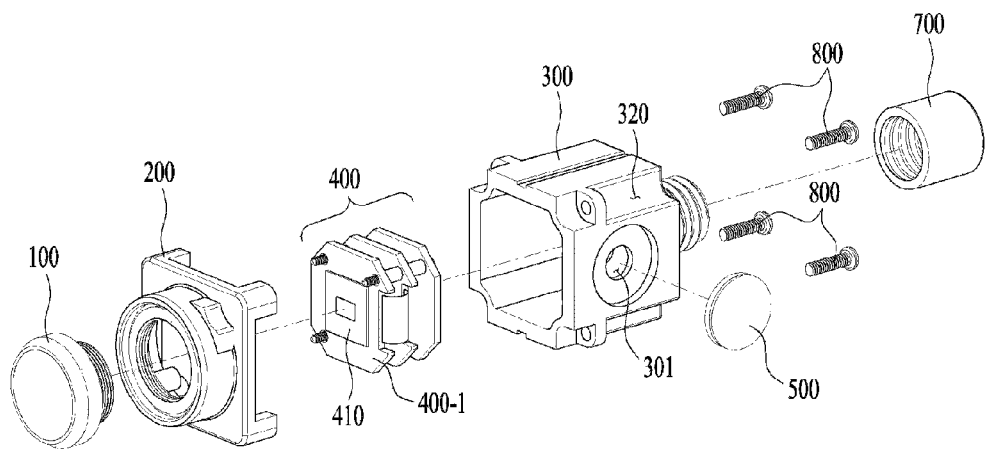
FIG. 2A is an exploded perspective view illustrating the camera module in accordance with one embodiment.
Figure 2B:
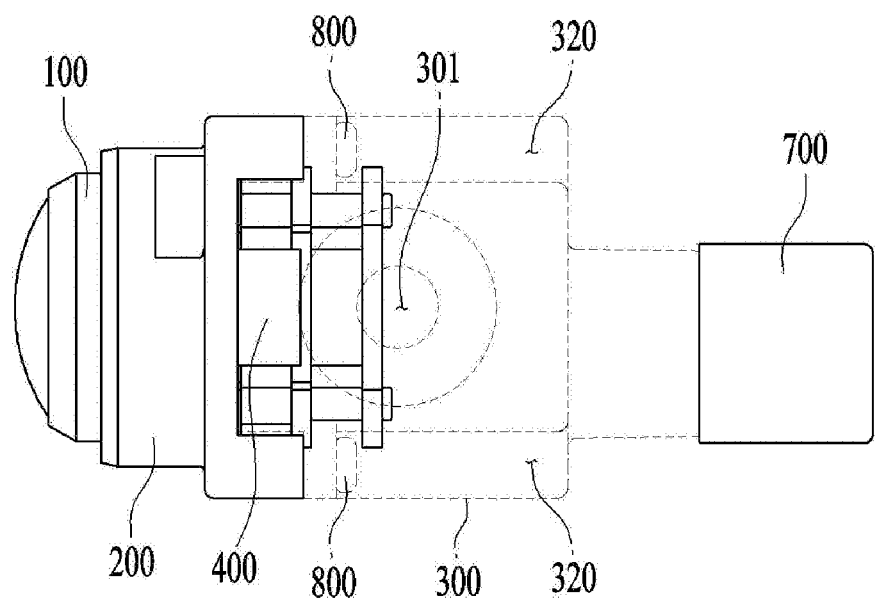
FIG. 2B is a view illustrating the configuration of the camera module in accordance with one embodiment.

FIG. 1 is a perspective view illustrating a camera module in accordance with one embodiment. FIG. 2A is an exploded perspective view illustrating the camera module in accordance with one embodiment. FIG. 2B is a view illustrating the configuration of the camera module in accordance with one embodiment.

The camera module in accordance with one embodiment may include a lens unit 100, a coupling unit 200, a housing 300, a printed circuit board 400, a membrane 500, and a socket 700.

The lens unit 100 is a region through which light containing an image of an external object is introduced into the camera module. For example, the lens unit 100 may be a lens barrel provided with at least one lens. At this time, the lens barrel may be configured as a one-piece lens, but may include a plurality of lenses aligned in a first direction.

In the embodiment, the lens unit 100 may be screwed to the coupling unit 200. Specifically, the coupling unit 200 may be formed with female screw-threads and the lens unit 100 may be formed with male screw-threads, to enable the lens unit 100 and the coupling unit 200 to be screwed together.

However, the disclosure is not limited to this embodiment, and the lens unit 100 may be coupled to the coupling unit 200 via, for example, shaping-fit or interference-fit. In this case, a sealing device may be provided to prevent moisture, dust, and other foreign substances from entering the camera module through a gap between the lens unit 100 and the coupling unit 200.

In addition, to achieve the seal between the lens unit 100 and the coupling unit 200, an adhesive may be applied to the region where the lens unit 100 and the coupling unit 200 are coupled to each other, so as to fix the lens unit 100 and the coupling unit 200 to each other.

The coupling unit 200 may be coupled at the front portion thereof to the lens unit 200 and at the rear portion thereof to the housing 300. The lens unit 100 is mounted in the front portion of the coupling unit 200. To this end, the front portion of the coupling unit 200 may be formed with a bore into which the lens unit 100 is mounted. The coupling unit 200 may be coupled at the rear portion thereof to the housing 300. For example, the coupling of the coupling unit 200 and the housing 300 may be implemented by couplers 800 such as, for example, screws or bolts, as exemplarily illustrated in FIGS. 2A and 2B.

The couplers 800 may serve to couple the coupling unit 200 and the housing 300 to each other. For example, for the fastening of the couplers 800, as exemplarily illustrated in FIG. 2A, the housing 300 may be formed with holes, and the coupling unit 200 may be formed with grooves at regions corresponding to the holes in the housing 300.

In the embodiment, since the housing 300 has the holes formed therein, retreat grooves 320 for the couplers 800 may be formed in the housing 300, so as to allow the couplers 800 to be easily fastened through the coupling unit 200 and the housing 300. However, any other coupling configuration between the housing 300 and the coupling unit 200 using the couplers 800 may be adopted, or the retreat grooves 320 may be omitted in the case where the housing 300 and the coupling unit 200 are coupled to each other without using the couplers 800.

For example, in the case where the couplers 800 are fastened in the direction opposite to that of the above embodiment, that is, in the case where the coupling unit 200 is formed with holes and the housing 300 is formed with grooves such that the couplers 800 are fastened from the holes of the coupling unit 200 toward the grooves of the housing 300, the retreat grooves 320 do not need to be formed.

In another embodiment, in the case where the coupling unit 200 and the housing 300 are coupled to each other via shaping-fit or interference-fit without using the couplers 800, the couplers 800 are no longer required, and thus the retreat grooves 320 do not need to be formed.

The housing 300 is coupled to the coupling unit 200, and is configured to accommodate most constituent elements of the camera module so as to hermetically seal the constituent elements from the outside. As such, the housing 300 may serve to prevent damage and malfunction of the constituent elements of the camera module accommodated therein due to external shocks and to prevent external moisture, dust and other foreign substances from entering the camera module.

The housing 300, as described above, may be formed with the retreat grooves 320 for the couplers 800 in order to allow the couplers 800 to be easily fastened through the coupling unit 200 and the housing 300. However, as described above, any other coupling configuration between the housing 300 and the coupling unit 200 using the couplers 800 may be adopted, or the retreat grooves 320 may be omitted in the case where the housing 300 and the coupling unit 200 are coupled to each other without using the couplers 800.

The housing 300 may be formed at the rear thereof with a raised portion. The raised portion serves to hermetically seal the region where an external cable for electrical connection of the camera module is mounted.

The socket 700 may be coupled around the raised portion of the housing 300 and serve to hermetically seal the external cable mounting region in conjunction with the raised portion. The socket 700 is screwed to the raised portion in this embodiment, but the disclosure is not limited thereto, and various other coupling methods such as, for example, coupling using an adhesive may be possible. Meanwhile, in another embodiment, the camera module may include no socket, and the cable for external connection may be directly connected to the camera module.

Meanwhile, the housing 300 may have a vent 301 formed therein. The vent 301 enables ventilation between the interior and the exterior of the housing 300, and also allows moisture inside the housing 300 to be discharged out of the housing 300.

The membrane 500, which will be described below, may be installed in the vent 301 to close the vent 301. Thus, in the housing 300, the center position of the vent 301 may approximately coincide with the center position of the membrane 500. This will be described below in detail with reference to the accompanying drawings.

The printed circuit board 400 may be accommodated inside the housing 300, and may serve to convert the image of the object included in the light that passes through the lens unit 100 into electrical signals and to transmit the electrical signals to an external device.

The printed circuit board 400, as exemplarily illustrated in FIG. 2B, may be accommodated, for example, in the front region of the housing 30, in order to allow the light that passes through the lens unit 100 to be introduced into the front of the printed circuit board 400. At this time, the printed circuit board 400 may be coupled to the coupling unit 200 via, for example, screwing and may be accommodated in the front region of the housing 300.

In addition, the printed circuit board 400 may receive electric power supplied from an external power source. A plurality of printed circuit boards 400 may be provided, and in particular, a first board 400-1, which is closest to the lens unit 100, may be provided on the front surface thereof with an image sensor 410.

The image sensor 410 is the region where the image of the object included in the light that passes through the lens unit 100 is formed. The image formed on the image sensor 410 may be converted into electrical signals by the printed circuit board 400 to thereby be transmitted to an external device.

The membrane 500 may serve to close the vent 301 formed in the housing 300 so as to prevent external foreign substances from entering the housing 300.

In addition, the membrane 500 may have an air discharge function to allow the air inside the housing 300 to be discharged out of the housing 300 so as to dissipate heat generated by the printed circuit board 400 even though the membrane 500 closes the vent 301. Accordingly, the membrane 500 may be formed of an air-permeable material.

In addition, when the membrane 500 is formed of the air-permeable material, the pressure inside the housing 300 and the pressure outside the housing 300 may be maintained the same. Thus, since the pressure outside the housing 300 is generally atmospheric pressure, the pressure inside the housing 300 may also be maintained at atmospheric pressure.

In this way, it is possible to prevent, for example, malfunction or damage to the elements accommodated in the housing 300 such as, for example, the printed circuit board 400, which may occur when the pressure inside the housing 300 is higher or lower than atmospheric pressure.

In addition, the membrane 500 may have a water discharge function to allow moisture present inside the housing 300 to be discharged outward through the vent 301 even though the membrane 500 closes the vent 301, and additionally a waterproofing function to prevent external liquid such as, for example, water, from entering the housing 300.

To realize the functions of the membrane 500 described above, the membrane 500 is necessarily formed of a material that allows the passage of dry air containing no moisture or wet air containing moisture that is vaporized to some extent, but does not allow the passage of water droplets or the like.

To this end, for example, the membrane 500 may be formed of polytetrafluoroethylene (PTFE). This is because PTFE satisfies the required function of the membrane 500.

Figure 3:
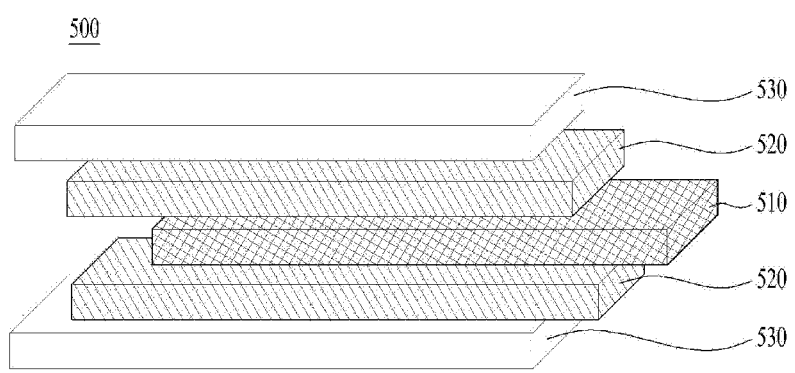
FIG. 3 is a view illustrating the configuration of a membrane in accordance with one embodiment.
Figure 4:
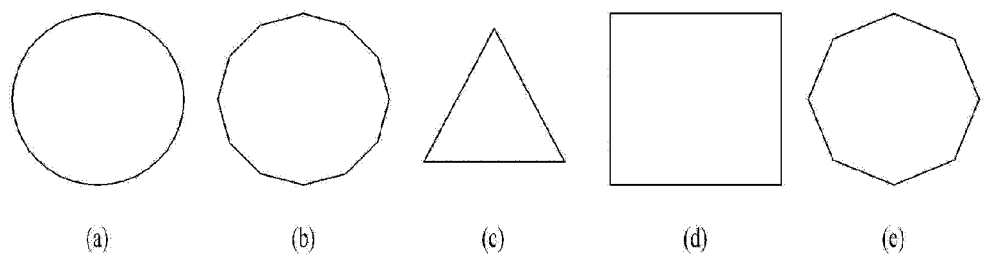
FIGS. 4 and 5 are views illustrating the shapes of the membrane in accordance with one embodiment.
Figure 5:
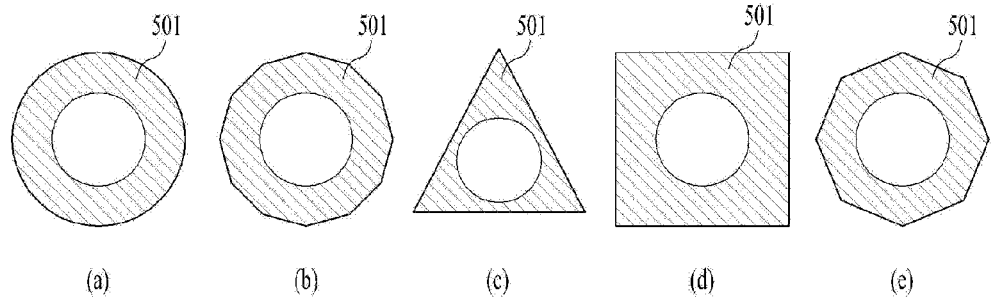

FIG. 3 is a view illustrating the configuration of the membrane 500 in accordance with one embodiment. FIGS. 4 and 5 are views illustrating the shapes of the membrane 500 in accordance with one embodiment.

The membrane 500 in accordance with one embodiment, as exemplarily illustrated in FIG. 3, may include a first film 510, adhesive layers 520, and second films 530.

The first film 510 may be formed of PTFE. As described above, PTFE has a characteristic of passing wet air containing moisture that is vaporized to some extent, but blocking the passage of non-vaporized water droplets having a relative humidity of 100% or other liquids. In addition, PTFE has a characteristic of blocking the passage of foreign substances such as, for example, dust having a larger particle size than the wet air.

Accordingly, the first film 510 may effectively prevent external foreign substances, which have a larger particle size than the wet air, from entering the housing 300. In addition, the first film 510 may serve as a passage through which water vapor present inside the housing 300 is discharged outward.

The adhesive layers 520 may be disposed on opposite sides of the first film 510 and may be bonded to opposite surfaces of the first film 510. Here, the adhesive layers 520 may have a ventilated porous structure.

Accordingly, the adhesive layers 520 may pass the wet air, but may not pass at least some of foreign substances such as, for example, dust having a larger particle size than the wet air. Thus, the adhesive layers 520 may serve to prevent at least some of the foreign substance from entering the housing 300.

To realize the function described above, the adhesive layer 520 may be formed, by way of example, of an adhesive containing a silicon component.

The second films 530 may be disposed respectively at opposite sides of the first film 510 and may be spaced apart from the first film 510 so as to be coupled to the first film 510 via the adhesive layers 520. Likewise the adhesive layers 520, the second films 530 may have a ventilated porous structure.

As such, the second films 530 may pass the wet air, but may not pass at least some of foreign substances such as, for example, dust having a larger particle size than the wet air. Thus, the second films 530 may serve to prevent at least some of the foreign substances from entering the housing 300, in conjunction with the adhesive layers 520.

To implement the function described above, for example, the second films 530 may be formed of a material containing silicon and polyethylene terephthalate (PET).

The membrane 500, as exemplarily illustrated in FIGS. 4 and 5, may have a circular shape, a triangular shape, a square shape, or a polygonal shape, when viewed from the front side.

At this time, the membrane 500 may have a larger area than the area of the vent 301, in order to completely close the vent 301. In addition, the center of the membrane 500 may coincide with or be located extremely close to the center of the vent hole 301 so as to ensure that the membrane 500 has a smaller area while completely closing the vent 301.

The membrane 500, as exemplarily illustrated in FIG. 5, may be formed at the edge region of one surface thereof with an adhesive portion 501. The central portion of the membrane 500 except the adhesive portion 501 may close the vent 301, and the adhesive portion 501 may be adhered to the inner or outer surface of the housing 300 to couple the membrane 500 to the housing 300.

The area and shape of the adhesive portion 501 may be appropriately selected in consideration of, for example, the area of the membrane 500, the area of the vent 301, the nature of the adhesive, and the coupling strength of the membrane 500 in relation to the housing 300.

In addition, the adhesive may be any one of various kinds of adhesives. For example, the adhesive may be thermosetting epoxy, ultraviolet-setting epoxy, acryl resin, or silicon.

Meanwhile, the adhesive may be polymer that is bonded via thermal fusion. In addition, instead of using a separate adhesive, the adhesive portion 501 may be directly coupled to the housing 300 via thermal fusion.

Figure 6:
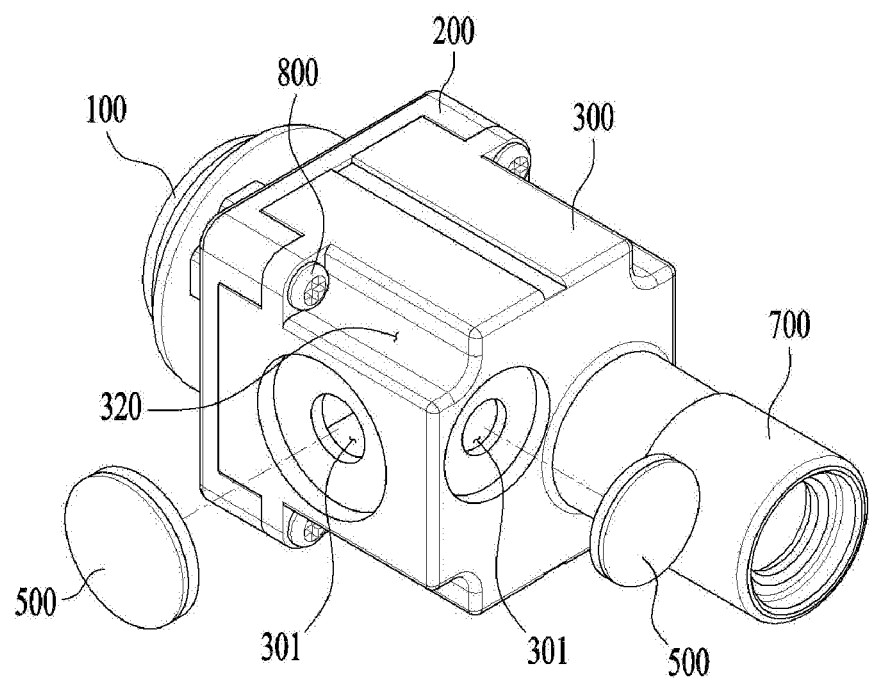
FIG. 6 is a view illustrating the mounting of the membrane in relation to the camera module in accordance with one embodiment.

FIG. 6 is a view illustrating the mounting of the membrane 500 in relation to the camera module in accordance with one embodiment.

The membrane 500 serves to close the vent 301, and therefore may be mounted and located at the position of the camera module at which the vent 301 is formed.

The vent 301 may be formed in the side portion of the housing 300, as exemplarily illustrated in FIGS. 1, 2A and 2B. In addition, the vent 301 may be formed in the bottom portion or the rear portion of the housing 300, as exemplarily illustrated in FIG. 6. In addition, although not illustrated, the vent 301 may be formed in the top portion of the housing 300.

Of course, a plurality of vents 301 may be respectively formed in two or more of the side portion, the top portion, the bottom portion, and the rear portion of the housing 300, and two or more vents 301 may be formed in any one of the side portion, the top portion, the bottom portion, and the rear portion of the housing 300.

The position and number of the vents 301 may be appropriately selected in consideration of, for example, the size and structure of the camera module and the inflow and outflow of air through the vents 301 and the membrane 500.

In particular, in consideration of the fact that foreign substances such as, for example, dust may fall down due to gravity in the case where the vent 301 is formed in the bottom portion of the housing 300, the amount of foreign substances such as, for example, dust approaching the vent 301 and the membrane 500 may be advantageously reduced compared to the case where the vent 301 is formed in the side portion, the top portion, or the rear portion of the housing 300.

Figure 7A:
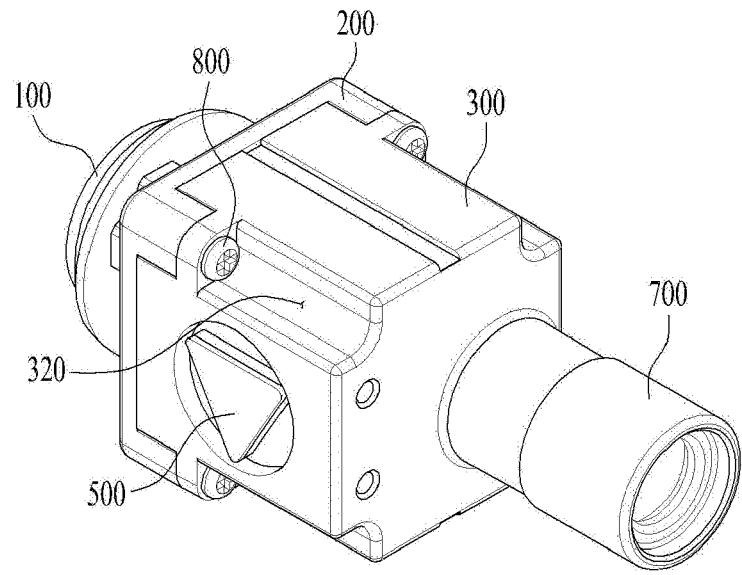
FIGS. 7A and 7B are views illustrating the mounting of the membrane in relation to the camera module in accordance with another embodiment.
Figure 7B:
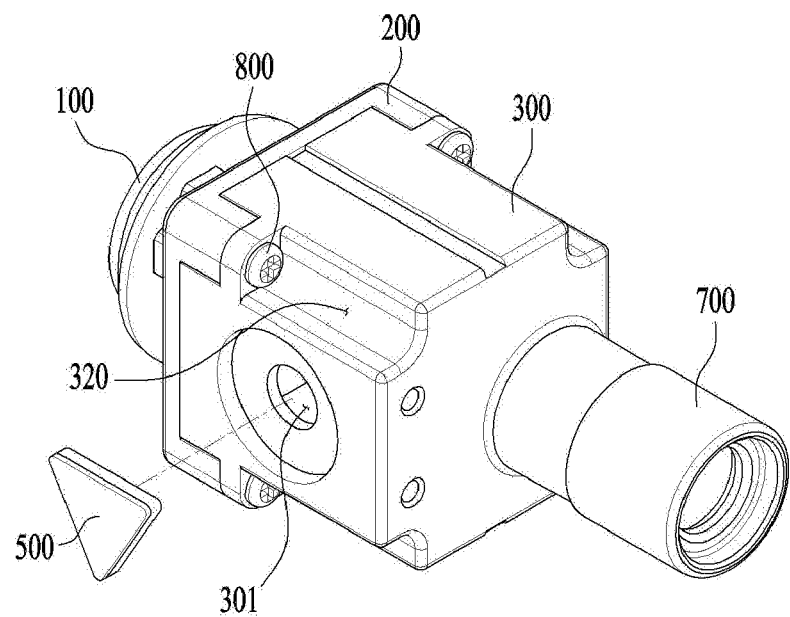

FIGS. 7A and 7B are views illustrating the mounting of the membrane 500 in relation to the camera module in accordance with another embodiment.

In FIGS. 7A and 7B, in the case where the vent 301 is formed in the side surface of the housing 300, the membrane 500, which has a triangular shape when viewed from the front side thereof, is mounted and located at the side surface of the housing 300 so as to close the vent 301.

At this time, the membrane 500 may be oriented such that any one apex of the triangle faces in the downward direction of the camera module and the side facing the apex faces in the upward direction of the camera module.

In this case, the user can easily recognize that the direction that the apex indicates is the downward direction of the camera module and that the region at which the membrane 500 is located is the side surface of the camera module.

Accordingly, without requiring that the upper, lower and lateral sides of the outside of the camera module be separately marked, locating the triangular membrane 500 on the camera module in the orientation described above may advantageously make it easy for the user to handle the camera module while distinguishing the upper, lower and lateral sides of the camera module from each other.

Figure 8:
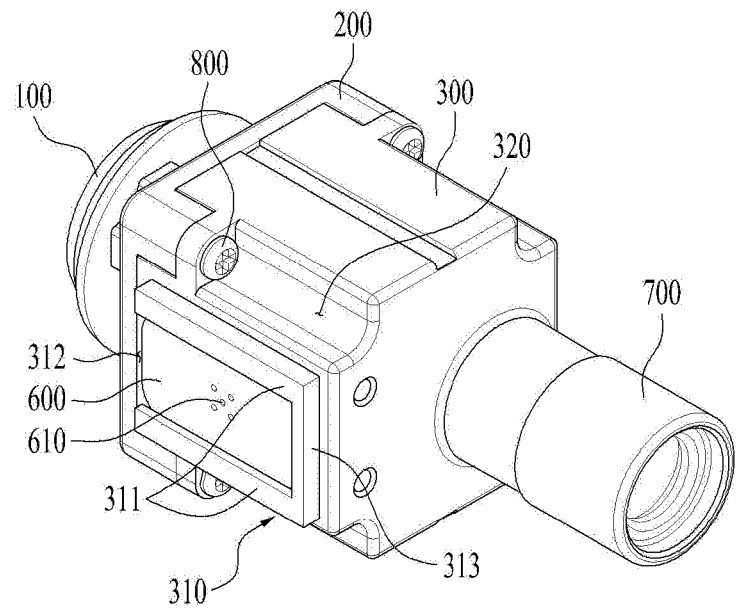
FIG. 8 is a view illustrating the mounting of a cover member in relation to the camera module in accordance with one embodiment.

FIG. 8 is a view illustrating the mounting of a cover member 600 in relation to the camera module in accordance with one embodiment. As exemplarily illustrated in FIG. 8, the camera module of the embodiment may include a cover member 600.

The cover member 600 may serve to close the membrane 500 which closes the vent 301. Thus, the cover member 600 may serve to prevent damage to the membrane 500 even if, for example, high pressure water or air is injected to the membrane 500. At this time, the cover member 600 may have a plate shape.

Generally, a camera module for a vehicle may be designed to endure severe external environmental conditions and pressure applied by, for example, water and air while the vehicle is being driven.

Accordingly, the cover member 600 may serve to protect the membrane 500, which is relatively weakly resistant to external pressure, to ensure that the camera module for a vehicle is smoothly operated without damage under severe environmental conditions.

Meanwhile, the cover member 600 may be formed with a through-hole 610 in a region opposite the membrane 500 to enable ventilation. Ventilation between the interior and the exterior of the housing 300 takes place via the through-hole 610, which allows air to be introduced into or discharged out of the housing 300.

The position and number of the through-holes 610 formed in the cover member 600 may be appropriately selected in consideration of, for example, design conditions to allow the camera module to endure the external environment, as well as the area of the vent 301 or the membrane 500.

At this time, the cover member 600 may be formed of a highly corrosion-resistant material, so as not to rust easily even if exposed to, for example, water. Therefore, the cover member 600 may be formed of, for example, stainless steel (SUS).

Meanwhile, the housing 300 may include a mounting structure 310 to couple the cover member 600 to the housing 300 so as to allow the cover member 600 to close the membrane 500. The mounting structure 310 may include a pair of first members 311, an opening 312, and a second member 313.

The first members 311 may be parallel to each other so as to support opposite side portions of the cover member 600. The opening 312 may serve as an entrance for insertion of the cover member 600. The second member 313 may be situated opposite the opening 312 and may serve to support the front portion of the cover member 600.

Accordingly, the cover member 600 may enter the mounting structure 310 through the opening 312 and then slide on the first members 311 until the front portion of the cover member 600 reaches the second member 313, thereby being mounted in the mounting structure 310. The cover member 600 may be separable from the mounting structure 310, or may be fixed to the mounting structure 310 via the application of an adhesive to the first members 311 and the second member 313.

Figure 9:
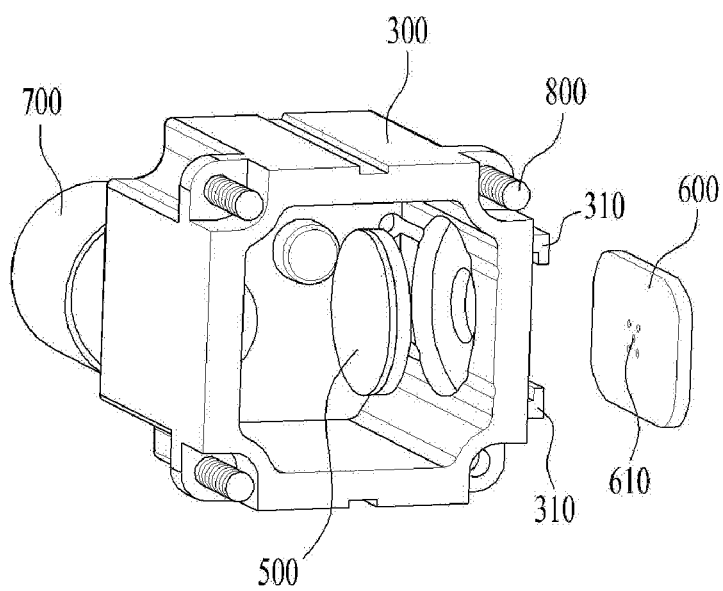
FIG. 9 is a view illustrating the mounting of the membrane and the cover member in relation to the camera module in accordance with one embodiment.

FIG. 9 is a view illustrating the mounting of the membrane 500 and the cover member 600 in relation to the camera module in accordance with one embodiment. When the cover member 600 is mounted to the housing 300, the cover member 600 and the membrane 500 may be configured to avoid interference therebetween.

Accordingly, as exemplarily illustrated in FIG. 9, the membrane 500 may be located inside the vent 301 to close the vent 301, and the cover member 600 may be located outside the vent 301 to close both the membrane 500 and the vent 301.

Specifically, the membrane 500 may be coupled to the inner surface of the housing 300 and the mounting structure 310 may be formed on the outer surface of the housing 300 such that the cover member 600 is mounted in the mounting structure 310. With this configuration, the cover member 600 and the membrane 500 may be respectively coupled to and disposed on the housing 300 without interference.

Figure 10A:
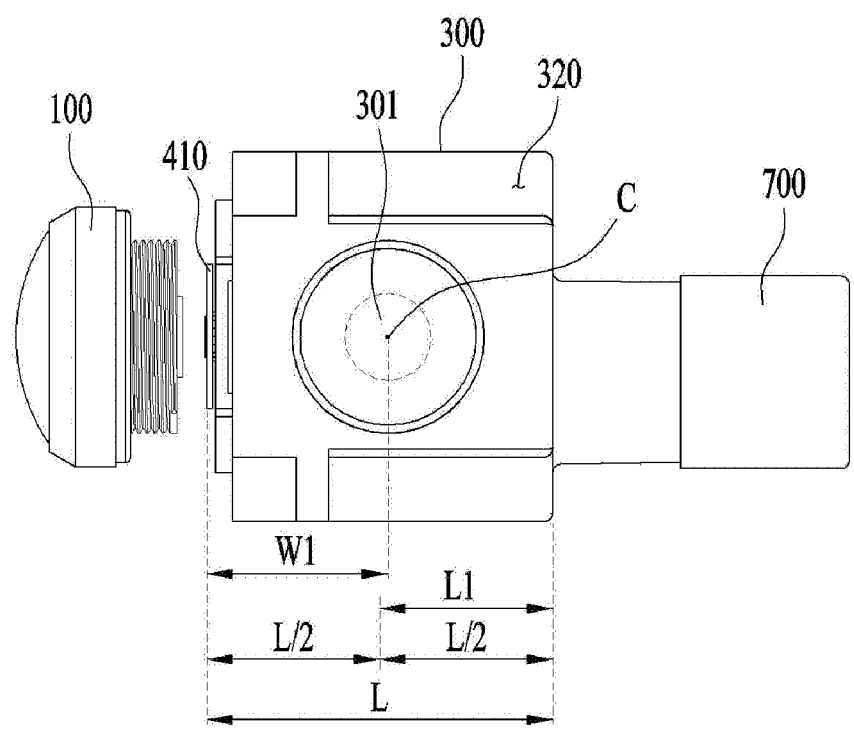
FIG. 10A is a side view illustrating the partial configuration of the camera module in accordance with one embodiment.
Figure 10B:
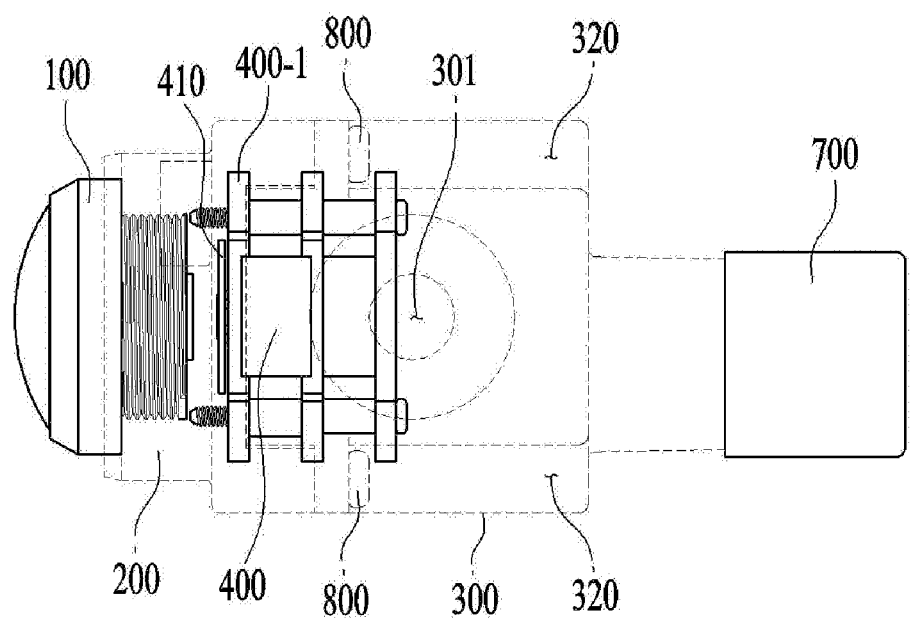
FIG. 10B is a view illustrating the arrangement of constituent elements of the camera module in accordance with one embodiment.

FIG. 10A is a side view illustrating the partial configuration of the camera module in accordance with one embodiment. FIG. 10B is a view illustrating the arrangement of constituent elements of the camera module in accordance with one embodiment. The printed circuit board 400, accommodated in the housing 300, may include electric circuits and various devices, and therefore may generate heat during the operation of the camera module.

Heat may be generated throughout the entire printed circuit board 400, and in particular, the first board 400-1, on which the image sensor 410 is mounted, may generate more heat than the other boards constituting the printed circuit board 400.

Therefore, although the ventilating membrane 500 is used for cooling the interior of the housing 300 in which the printed circuit board 400 is accommodated, there is a need for a structure capable of preventing the membrane 500 from being melted or damaged by the heat generated by the printed circuit board 400.

To this end, the membrane 500 may be spaced apart from the printed circuit board 400 by at least 1 mm. That is, the membrane 500 and the printed circuit board 400 may be spaced apart from each other by at least 1 mm, which is constant regardless of the region of the membrane 500 and the printed circuit board 400 at which the distance is measured.

At this time, the upper limit of the distance between the membrane 500 and the printed circuit board 400 may be appropriately determined according to the sizes of the camera module, the membrane 500, and the printed circuit board 400.

Meanwhile, light which passes through the vent 301 and the membrane 500 and enters the housing 300 may interfere with the light introduced into the image sensor 410 and the lens unit 100, or may cause diffuse reflections inside the housing 300.

The occurrence of light interference and diffuse reflections may deteriorate the quality of the image captured by the camera module, and therefore there is a need for a structure capable of preventing the occurrence of light interference and diffuse reflections.

Accordingly, the printed circuit board 400 may be constituted of a plurality of boards, the image sensor 410 may be provided on the front surface of the first board 400-1, which is closest to the lens unit 100, and the center C of the vent 301 may be located close to the rear surface of the housing 300 on the basis of the middle point of the distance L from the front surface of the image sensor 410 to the rear surface of the housing 300.

That is, referring to FIG. 10A, the center C of the vent 301 may be located within a range L1 between the rear surface of the housing 300 and the middle point of the distance L from the front surface of the image sensor 410 and the rear surface of the housing 300.

However, it will be clear that the position of the center C of the vent 301 may be further geometrically limited within the range L1 by the diameter of the vent 301 and the shape and cross sectional area of the membrane 500.

That is, for example, when the membrane 500 has a circular shape, the center C of the vent 301 may be located within a range corresponding to the radius of the membrane 500 from the rear surface of the housing 300.

When the center C of the vent 301 is located at the position described above, light that passes through the vent 301 and the membrane 500 closing the vent 301 and enters the housing 300 is distributed over a relatively far distance from the lens unit 100 and the image sensor 410, which may prevent or reduce the occurrence of light interference and diffuse reflections.

Meanwhile, the center C of the vent 301 may be located as follows. That is, the center of the vent 301 may be present within a range of 15 mm to 35 mm from the front surface of the image sensor 410 to the rear of the housing 300.

In other words, as exemplarily illustrated in FIG. 10A, the center C of the vent 301 may be located within a range corresponding to a first distance W1, measured from the front surface of the image sensor 410 to the rear of the housing 300.

When the center C of the vent 301 is located at the position described above, light that passes through the vent 301 and the membrane 500 closing the vent 301 and enters the housing 300 is distributed over a relatively far distance from the lens unit 100 and the image sensor 410, which may prevent or reduce the occurrence of light interference and diffuse reflections.

The position of the vent 301 in accordance with one embodiment has been described above in detail. The membrane 500 may be located such that the center thereof coincides with or is extremely close to the center C of the vent 301, thereby being disposed on the housing 300 so as to completely close the vent 301. As such, the position of the membrane 500 on the housing 300 may be determined by the position of the vent 301.

In the embodiment, the membrane 500 may discharge moisture present inside the housing 300 of the camera module to the exterior of the housing 300 and may prevent external foreign substances such as, for example, dust and water droplets, from entering the housing 300 through the vent 301.

In addition, since the membrane 500 may ventilate the interior of the housing 300 so as to communicate with the exterior of the housing 300, heat generated, for example, by the printed circuit board 400 inside the housing 300 may be discharged to the exterior of the housing 300 via convection using air as a medium, which may realize effective cooling of the interior of the housing 300.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module comprising:
    a lens unit;
    a coupling unit coupled to the lens unit;
    a housing coupled to the coupling unit, the housing being configured to accommodate a printed circuit board therein and having a vent formed therein;
    a membrane formed of an air-permeable material and configured to close the vent formed in the housing so as to inhibit external foreign substances from entering the housing; and
    a cover member configured to close the membrane;
    wherein the membrane is coupled to an inner surface of the housing to close the vent, and the cover member is located outside the housing to close both the membrane and the vent; and
    wherein a face of the membrane and a face of the cover member facing that of the membrane are spaced apart from each other at least as much as a thickness of the housing at a portion where the vent is formed.

2. The camera module according to claim 1, wherein the membrane includes:
    a first film;
    a pair of adhesive layers respectively disposed on opposite sides of the first film; and
    a pair of second films respectively disposed on opposite sides of the first film and spaced apart from the first film, the second films being coupled to the first film via the adhesive layers.

3. The camera module according to claim 2, wherein the first film is formed of polytetrafluoroethylene (PTFE).

4. The camera module according to claim 2, wherein the second films and the adhesive layers have a ventilated porous structure.

5. The camera module according to claim 1, wherein the membrane is formed into at least one shape among a circular shape, a triangular shape, a square shape, and a polygonal shape.

6. The camera module according to claim 1, wherein the membrane is formed, at an edge region of one surface thereof, with an adhesive portion.

7. The camera module according to claim 1, wherein the vent is formed in at least one of a side portion, a top portion, a bottom portion and a rear portion of the housing, and the vent formed in each portion is closed by the membrane.

8. The camera module according to claim 1, wherein the cover member covers the membrane.

9. The camera module according to claim 8, wherein the cover member is formed of stainless steel.

10. The camera module according to claim 8, wherein the membrane is located inside the vent to close the vent, and the cover member is located outside the vent to close the membrane and the vent.

11. The camera module according to claim 1, wherein the cover member has a through-hole formed in a region opposite the membrane to enable ventilation.

12. The camera module according to claim 1, wherein the housing includes a mounting structure configured to couple the cover member to the housing so as to allow the cover member to close the membrane.

13. The camera module according to claim 12, wherein the cover member is formed into a plate shape, and
wherein the mounting structure includes:
a pair of first members arranged parallel to each other to support opposite side portions of the cover member;
an opening forming an entrance for insertion of the cover member; and
a second member situated opposite the opening, the second member being configured to support a front portion of the cover member.

14. The camera module according to claim 1, wherein the printed circuit board includes a plurality of printed circuit boards,
wherein a first board, among the printed circuit boards, located closest to the lens unit is provided on a front surface thereof with an image sensor, and
wherein a center of the vent is located closer to a rear surface of the housing than a front surface of the image sensor on the basis of a middle point of a distance from the front surface of the image sensor to the rear surface of the housing.

15. The camera module according to claim 1, wherein the printed circuit board includes a plurality of printed circuit boards,
wherein a first board, among the printed circuit boards, located closest to the lens unit is provided on a front surface thereof with an image sensor, and
wherein a center of the vent is present within a range of 15 mm to 35 mm from a front surface of the image sensor to a rear portion of the housing.

16. The camera module according to claim 1, wherein the membrane is spaced apart from the printed circuit board by at least 1 mm.

17. A camera module comprising:
a lens unit;
a coupling unit coupled to the lens unit;
a housing coupled to the coupling unit, the housing being configured to accommodate a printed circuit board therein and having a vent formed therein;
a membrane formed of an air-permeable material and configured to close the vent formed in the housing so as to inhibit-external foreign substances from entering the housing; and
a cover member configured to close the membrane closing the vent;
wherein the membrane is coupled to an inner surface of the housing to close the vent, and the cover member is located outside the housing to close both the membrane and the vent; and
wherein a face of the membrane and a face of the cover member facing that of the membrane are spaced apart from each other at least as much as a thickness of the housing at a portion where the vent is formed.

18. The camera module according to claim 17, wherein the membrane is located inside the vent, and the cover member is located outside the vent.

19. The camera module according to claim 17, wherein at least a portion of the membrane is formed of PTFE.

20. A camera module comprising:
a lens unit;
a coupling unit coupled to the lens unit;
a housing coupled to the coupling unit and having a vent formed therein;
a printed circuit board accommodated inside the housing and having an image sensor mounted thereon;
a membrane formed of an air-permeable material and configured to close the vent formed in the housing so as to inhibit external foreign substances from entering the housing; and
a cover member configured to close the membrane closing the vent;
wherein the membrane is coupled to an inner surface of the housing to close the vent, and the cover member is located outside the housing to close both the membrane and the vent; and
wherein a face of the membrane and a face of the cover member facing that of the membrane are spaced apart from each other at least as much as a thickness of the housing at a portion where the vent is formed.

* * * * *